United States Patent [19]
Arenhold

[11] Patent Number: 4,733,879
[45] Date of Patent: Mar. 29, 1988

[54] DEVICE FOR FIXING A MUD FLAP TO THE FENDER FOLD OF A MOTOR VEHICLE

[76] Inventor: Knut Arenhold, Westend 7, 2000 Hamburg 52, Fed. Rep. of Germany

[21] Appl. No.: 49,986

[22] Filed: May 15, 1987

Related U.S. Application Data

[62] Division of Ser. No. 857,137, Apr. 29, 1986, Pat. No. 4,688,814, which is a division of Ser. No. 602,503, Apr. 20, 1984, Pat. No. 4,605,238.

[30] Foreign Application Priority Data

Apr. 28, 1983 [DE] Fed. Rep. of Germany ....... 3315341

[51] Int. Cl.$^4$ ............................................. B62B 9/14
[52] U.S. Cl. ............................... 280/154.5 R; 24/304; 248/225.31
[58] Field of Search ............... 280/154.5 R, 153 R, 280/154; 24/304, 306, DIG. 11; 248/225.31, 228, 229

[56] References Cited

U.S. PATENT DOCUMENTS

| | | | |
|---|---|---|---|
| 3,333,799 | 8/1967 | Peterson | 248/228 X |
| 3,953,053 | 4/1976 | Arenhold | 280/154.5 R |
| 4,457,053 | 7/1984 | Niwa | 24/304 |
| 4,605,238 | 8/1986 | Arenhold | 280/154.5 R |
| 4,688,814 | 8/1987 | Arenhold | 280/154.5 R |

Primary Examiner—John J. Love
Assistant Examiner—Michael Mar
Attorney, Agent, or Firm—Murray and Whisenhunt

[57] ABSTRACT

A device for fixing a mud flap has a bracket with an elongated central part, a bracket section provided at one end of the central part which can be engaged with the free edge of the fender fold, as well as a support at its other end. The device also has a pressure member, which can be pressed against the vehicle body by means of a clamping member supported on the support, in order in this way to position the bracket. A fixing member for fitting the mud flap is connected to the device.

5 Claims, 16 Drawing Figures

DEVICE FOR FIXING A MUD FLAP TO THE FENDER FOLD OF A MOTOR VEHICLE

This is a divisional application of Ser. No. 857,137, filed Apr. 29, 1986, now U.S. Pat. No. 4,688,814, which in turn is a divisional application of Ser. No. 602,503, filed Apr. 20, 1984, now U.S. Pat. No. 4,605,238.

BACKGROUND OF THE INVENTION (a) Field of the Invention

The invention relates to a devce for fixing a mud flap to the fender fold of a motor vehicle. The fender fold is the in-turned edge of a vehicle at the mudguard or fender.

(b) Description of the Prior Art

For fixing a mud flap to the fender fold of a motor vehicle, an edge region of the mud flap is generally applied to the fender fold and fixing is achieved by U shaped clips which engage round both the fender fold and the corresponding area of the mud flap (U.S. Pat. No. 3,953,053). It is also possible to provide on the mud flap fixing region a bendable sheet metal strip extending below the fixing points in order to stabilize the flexible mud flap, which is made from rubber or similar materials, whilst permitting the alignment thereof about a vertical and a horizontal axis, so that after fitting, the mud flap can be brought into the optium operating position.

Such a mud flap fixing procedure is possible without difficulty if the fender fold is freely accessible. However, an increasing number of vehicles are being equipped with a so-called inner fender, i.e. a lining of the inner area of the wheel case which is generally made from relatively rigid plastic or aluminum in order to obtain a smooth continuous surface and reduce corrosion of metal parts in the vicinity of the wheel case. This inner fender very frequently engages on the outer surface of the fender fold, i.e. that facing the wheel, to which the mud flap would be applied in the case of a freely accessible fender fold and would be fixed by means of U-shaped clips thereto. However, due to the engagement of the inner fender with the fender fold, its free edge is no longer freely accessible and the fixing of a mud flap by means of U-shaped clips can no longer be easily performed. In fact, when such clips are used, it is necessary to cut the inner fender in the vicinity of the desired fixing points, which is difficult and undesired, particularly as it can occur with such a mounting procedure that the cut-out areas on the inner fender initially provided for fixing purposes prove unsuitable during fitting, so that other fixing points have to be found and other cuts have to be made in the inner fender.

Thus, in practice, it has hitherto only been possible to fix mud flaps to a fender fold externally covered by an inner fender by drilling both through the latter and the fender fold and then making the fixture by means of screws. However, this suffers from the disadvantage of damaging the primer and paint-work of the fender fold leading to corrosion-prone areas.

OBJECT OF THE INVENTION

It is the principal object of the invention to provide a device enabling a mud flap to be fixed to the fender fold, even if the latter is at least partly covered on its outer face, i.e. that facing the wheel by an inner fender.

SUMMARY OF THE INVENTION

According to the invention, this objective is achieved by a device having a bracket or hook with a central part, whose length exceeds the width of the fender fold, with a bracket or hook section on one end of the central part for engaging round the free edge of the fender fold. At the other end of the central part a support for at least one clamping member is provided. A pressure member which can be pressed by the clamping member against the vehicle body area is arranged between the support and said body area connected to the fender fold when the bracket section engages with the free edge of said fender fold. At least one fixing member can be engaged with the mud flap.

Thus, the device according to the invention comprises at least two parts, whereof the bracket is introduced between the inner fender and the fender fold and is then engaged with the free edge of the latter by means of the bracket section. In this position, of the bracket, a pressure member is pressed against the vehicle body area with the aid of a clamping member coupled to the support and preferably constituted by a screw which extends through a taphole in the support. Thus, the bracket is supported on this pressure member and is engaged by the bracket section with the fender fold. The mud flap is fixed to the device with the aid of the fixing member. The latter can, for example, be fixed to the end of the pressure member facing the central part of the bracket and extends through an elongated slot in the central part of the bracket, whose longitudinal extension passes in the direction of the connecting line between the bracket section and the support. The fixing member preferably comprises a threaded bolt.

In such a construction, the fixing member for the mud flap and the pressure member form a unit and the fixing member extending through the elongated slot in the central part of the bracket always comes into the same position with respect to the vehicle body area connected or adjacent to the fender fold, i.e. the fixing member position is independent of the width of the particular fender fold, because the fixing member can be displaced in the direction of the longitudinal extension of the central part of the bracket, due to the elongated slot.

Whereas two brackets are generally required for fixing a mud flap, in order to permit fixing to the fender fold at two spaced points, the bracket can also have two spaced bracket sections, so that the mud flap can be fixed by means of a single bracket.

As the outer face to the fender fold, i.e. the face facing the wheel, and the vehicle body surface connected or adjacent to the fender fold generally form an obtuse angle, on fixing the bracket and pressure member force components are produced, which can lead to a sliding of the pressure member and clamping member and consequently the complete device. In order to prevent such a sliding action, the pressure member can be firmly bonded to the vehicle body area so that the pressure member absorbs the force components which would otherwise cause sliding. For this purpose, the pressure member is preferably made from relatively thin sheet metal or plastic, so that it has a certain flexibility and can adapt to the shape of the vehicle body in the bonded area.

In order to prevent sliding of the device during fitting, it is also possible to provide a bracket area on the end of the pressure member remote from the central part of the bracket which bracket area can be engaged with one end of the vehicle body. This arrangement is particularly suitable for fitting front wheel mud flaps, because then the bracket area of the pressure member can be engaged with the edge of the door opening. There is obviously no need for such a pressure member to be bonded to the body.

At its end facing the central part of the bracket, the pressure member preferably has a portion bent in the direction of the support, so that particularly when using a screw as the clamping member, the latter engages behind the bent portion during installation so that even when the screw is not completely tightened, the bracket cannot be tilted round the area of its bracket section and away from the pressure member.

For example, the mud flap fixing member can comprise a screw and can be placed through holes provided in the central part of the bracket and the pressure member.

The objective is also achieved by a device which comprises a bracket with a central part, which is equal to or longer than the width of the fender fold, having a bracket section at one end of the central part for engaging round the free edge of the fender fold and a holding section fixable to the vehicle body and provided at the other end of the central part. At least one fixing member can be engaged with the mud flap and is fixed or fixable to the bracket.

As no separate pressure member is provided in this device which, with the aid of a clamping member, permits the securing of the bracket to the fender fold and to the vehicle body, the holding section can be adhesively engaged with the vehicle body at the bracket section embracing the free edge of the fender fold, so that the bracket is consequently held solely by this adhesive-bonded joint.

However, it is also possible to form the holding section from two separate parts, whereof one is constructed in one piece with the central part and the other has at its end remote from the central part a bracket area for engaging with one edge of the body.

The two parts of the holding section are then interconnected, preferably by means of a screw and their distance from one another is variable, so that the bracket can be fixed in position by engagement of the bracket area of the holding section and by bringing together the two parts of the latter, e.g. by tightening the screw.

The objective can also be achieved with a device having a bracket with a central part, whose length exceeds the width of the fender fold having a bracket section at one end of the central part for embracing the entire width of the fender fold, together with a supporting section connected to the bracket section and angled away from the central part which bears against the inner face of the vehicle body connected to the fender fold at the bracket section embracing the latter. A support for a clamping member is located at the other end of the central part and on the same side as the bracket section. At least one fixing member can be engaged with the mud flap. The support preferably has a taphole for receiving a screw servicing as the clamping member, whilst the fixing member is preferably a screw bolt, which can be fixed to the central part.

In the case of such a device, the inner fender must generally be raised further from the fender fold than in the case of the aforementioned devices, in order to be able to guide behind said fender fold the bracket section, including the supporting section connected thereto. When the bracket has reached this position and if the clamping member, i.e. preferably a screw, is engaged through a taphole in the shoulder and is screwed with its free end further in the direction of the outside of the vehicle body and is pressed against the latter, optionally accompanied by the interposing of a packing shim, then the bracket is more firmly drawn against the free edge of the fender fold and the supporting section is pressed against the inside of the body. In particular, the engagement of the supporting section with the inside of the vehicle body prevents any sliding of the bracket as a result of the force components generally occurring due to the obtuse angle between the fender fold and the connected or adjacent vehicle body surface. Due to the relatively rigid construction of the bracket, these force components also cause no deformation of the bracket.

It may occur that the inner fender does not engage on the fender fold face facing the wheel but is instead fixed to the opposite side of the fender fold and is thereby set back somewhat by means of a bend, the space between the assumed extension of the outer fender fold face into the wheel case being filled with sound-insulating material. In the case of a vehicle constructed in this way, the latter device and also the device with the bracket and a pressure member to be engaged with the vehicle body can be used for fitting a mud flap, if the bracket has at its free end teeth or claws, which essentially run in the direction of the other end of the central part and are laterally spaced from the central part to such an extent that an engagement in the sound-insulating material is possible.

BRIEF DESCRIPTION OF THE DRAWINGS

The invention is described in greater detail hereinafter relative to non-limitative embodiments and the accompanied drawings. In the drawings:

FIG. 9 shows an embodiment of a device with a bracket according to FIG. 2 and a pressure member which can be hooked in;

FIG. 12 shows an embodiment with a bracket which can be hung in;

Figure 1:
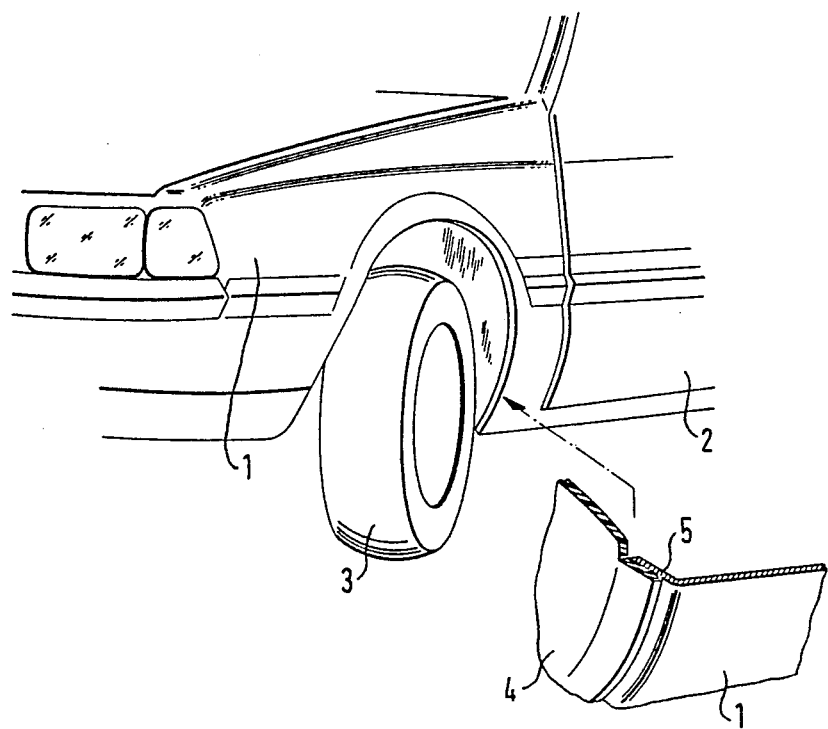
FIG. 1 is a view and a cutaway detail of the position of the fender fold and the inner fender in the front wheel case of an automobile.

The automobile partly shown in FIG. 1 has a vehicle body 1 and a front door 2, which is located in an opening in the vehicle body 1. The wheel opening is provided in vehicle body 1 for front wheel 3 and a wheel case extends round the upper part of front wheel 3. In a conventional manner, the edge region of the wheel opening is bent over inwards and forms a fender fold 5. The outer face, i.e. the face of fender fold 5 facing wheel 3 and the outer face of vehicle body 1 connected to the fender fold form an obtuse angle, which is necessary to permit mould release of the metal sheet after pressing.

The wheel case is lined with a so-called inner fender 4, which can e.g. comprise a relatively rigid plastic or aluminium. As is shown in the detailed view, the inner fender 4 engages on the outer face of fender fold 5, so that the free edge and most of the outer face of the fender fold are covered.

As can be gathered from FIG. 1, it is not readily possible to fix a mud flap to fender fold 5 by means of U-shaped clips, which engage round the fender fold and the edge area of the mud flap, because the inner fender 4 prevents the insertion of such clips.

Figure 2:
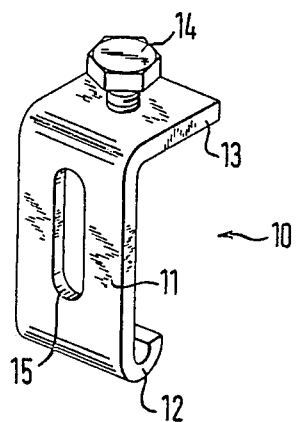
FIG. 2 is a perspective view of a bracket according to a first embodiment.
Figure 3:
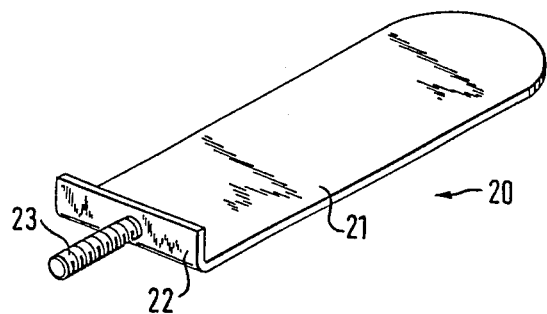
FIG. 3 is a perspective view of a pressure member for the bracket according to FIG. 2.
Figure 4:
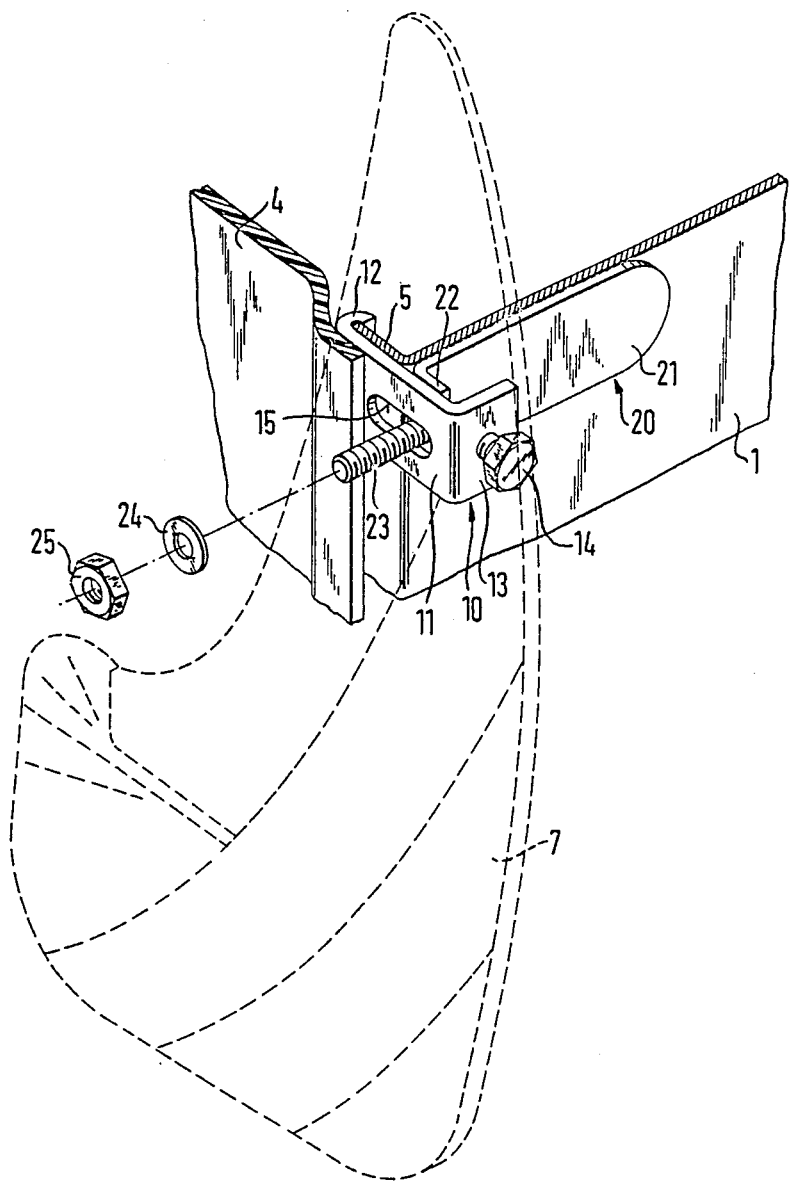
FIG. 4 is a partial representation of the fitted device comprising the bracket according to FIG. 2 and the pressure member according to FIG. 3.

These difficulties in connection with the fixing of the mud flap are obviated by the use of a device, as shown in the fitted state in FIG. 4, whilst its components are shown in FIGS. 2 and 3.

This device comprises a bracket 10 which has an elongated central part 11, whose length exceeds the width of fender fold 5. At the lower end of bracket 10 in FIG. 2, is shaped a bracket section 12 which, as shown in FIG. 4, engages round the free edge of fender fold 5 in the fitted state. The distance between the free end of the bracket section 12 and the central part 11 is preferably only slightly greater than the material thickness of fender fold 5, in order to ensure a good positioning. At the opposite end of central part 11 is located a support 13, which is bent in a substantially rectangular manner and has a taphole into which is screwed a screw 14. An elongated slot 15 is provided in central part 11, with its longitudinal extension in the direction of the connection of bracket 12 and support 13.

The device also has a pressure member 20, which has an elongated base plate 21, which is sufficiently flexible to adapt to the vehicle body shape and which is bent at one end. A threaded bolt 23 is centrally fixed to the bent portion 22. On its bottom side in FIG. 3, base plate 21 can be coated with a contact adhesive, which is initially covered with a protective foil.

For fitting the device at a point suitable for fixing a mud flap, the bracket 10 is mounted on the threaded bolt 23 of pressure member 20, so that bolt 23 extends through elongated slot 15. Bracket section 12 of bracket 10 is then positioned at the desired point between the inner fender 4 and fender fold 5 and the bracket section 12 is engaged with the free edge of the fender fold 5. Pressure member 20 is then bonded to the vehicle body 1 in such a way that its bent portion 22 is substantially located in the same plane as fender fold 5 and extends away from the latter (FIG. 4). When the two members are in this position, screw 14 is tightened and engages behind the bent portion 22. The position of screw 14 and bent portion 22 are chosen in such a way that the screw 14 engages with the rear face of bent portion 22 and consequently draws the central part 11 of bracket 10 against the outer face of bent portion 22. Through the screw engaging with the surface of base plate 21, bracket 12 is firmly drawn against the free edge of fender fold 5 and bracket 10 is reliably positioned.

Threaded bolt 23 does not prevent the tightening of screw 14 and consequently the resulting displacement of bracket 10 to the front and right in FIG. 4, because it extends through elongated slot 15. Instead, independently of the width of fender fold 5, threaded bolt 23 is always at the same distance from the transition between fender fold 5 and vehicle body 11, whilst the bracket 10 can be fitted independently of the width of the fender fold and consequently can be fitted to different vehicle types.

The mud flap 7, indicated by the broken line in FIG. 4, can then be placed on the threaded bolt 23 of the fitted device and can be fixed by means of packing washer 24 and nut 25. However, as in general two spaced fixing points are required for the reliable fixing of the mud flap, generally a further corresponding device is fitted to fender fold 5 at a distance from the device according to FIG. 5. However, it is also possible to use in place of the bracket according to FIG. 2, a bracket of the type shown e.g. in FIGS. 5 or 6.

Figure 5:
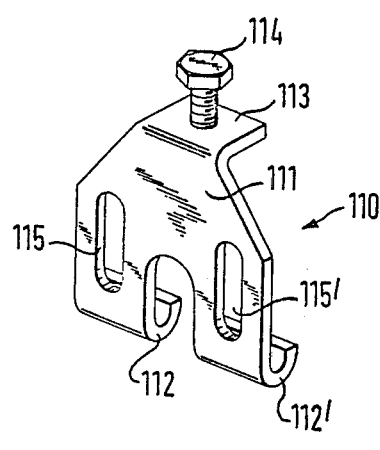
FIG. 5 shows another embodiment of a bracket.

The bracket according to FIG. 5 has in its central part 111 a bent support 113, into which can be screwed a screw 114 corresponding to screw 14 of FIG. 2. Central part 111 has two spaced, parallel elongated slots 115,115' and with each of the latter is associated a bracket 112, 112', which are spaced from one another as a result of a notch in central part 111. Such bracket can be fitted together with two correspondingly dimensioned pressure members, constructed in a similar manner to pressure member according to FIG. 3, or with a single pressure member 120 according to FIG. 7, so that the threaded bolts 123, 123' fixed to the bent portion 122 of base plate 121 then extend through elongated slots, 115, 115', whilst the brackets 112, 112' engage in spaced manner with the free edge of fender fold 5. The mud flap can then be mounted on the two screw bolts 123, 123', so that it is held in non-rotary manner at two spaced points.

Figure 7:
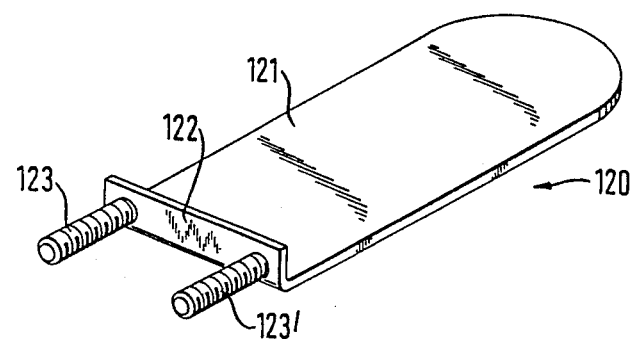
FIG. 7 shows a pressure member, which can be used with the brackets according to FIGS. 5 and 6.

It should be noted that it can also suffice to fix the pressure member 20 according to FIG. 3 or the pressure member 120 according to FIG. 7 in the described manner to vehicle body 1 by adhesive bonding without using a bracket. Fixing then takes place in the described way on screw bolts 23 or 123, 123', this system also being usable on vehicles without a fender fold.

The represented pressure members 20 or 120 can also be secured in reversed manner to the vehicle body, so that the in each case upper face of base plate 21 or 121 in FIG. 3 and 7 is the bonded surface. The face of portion 22 or 122 adjacent thereto can then be bonded to the fender fold.

It is obviously also possible to construct the pressure member in T-shaped manner, so that the base plate has two portions bent in opposite directions, whereof one is bonded to the fender fold and the other carries the screw bolt or bolts.

Figure 6:
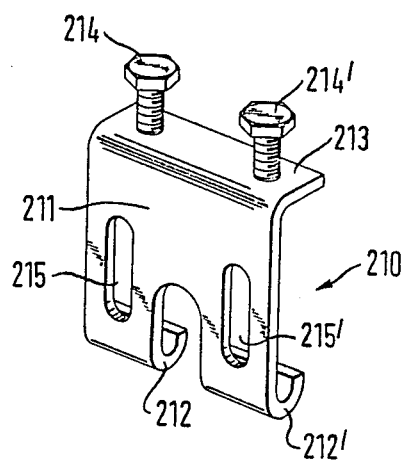
FIG. 6 shows another embodiment of a bracket.

The bracket 210 of FIG. 6 has essentially the same construction as the bracket of FIG. 5. In its central part 211 there are two spaced, parallel, elongated slots 215, 215', with which are associated in laterally spaced manner bracket sections 212, 212'. However, the support 213 bent with respect to central part 211 has two laterally spaced screws 214, 214', so that the fixing of the bracket by engagement with a pressure member 120 adhesively bonded to the vehicle body is better than if there was only a single screw 114 according to FIG. 5.

Figure 8:
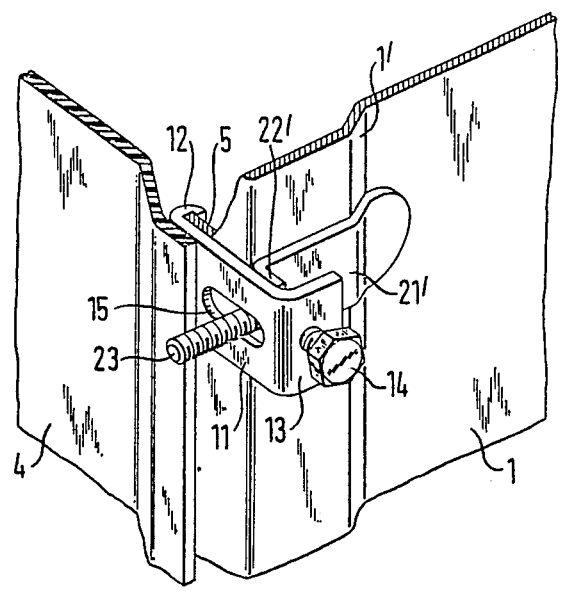
FIG. 8 shows an embodiment of a device with a bracket corresponding to FIG. 2 and a pressure member modified compared with FIG. 3.

The device according to FIG. 8 essentially corresponds to that according to FIG. 4, but the pressure member is made from relatively rigid material. Its base plate 21' has a displaced end area, between which and the remainder of the base plate is provided a sloping area, which engages on the transition bevel 1' of vehicle body 1. As a result of this engagement, a mounting and positioning of pressure member 21 is obtained which, without bonding, absorbs the afore-mentioned force components which otherwise could cause detachment of the device.

Figure 9:
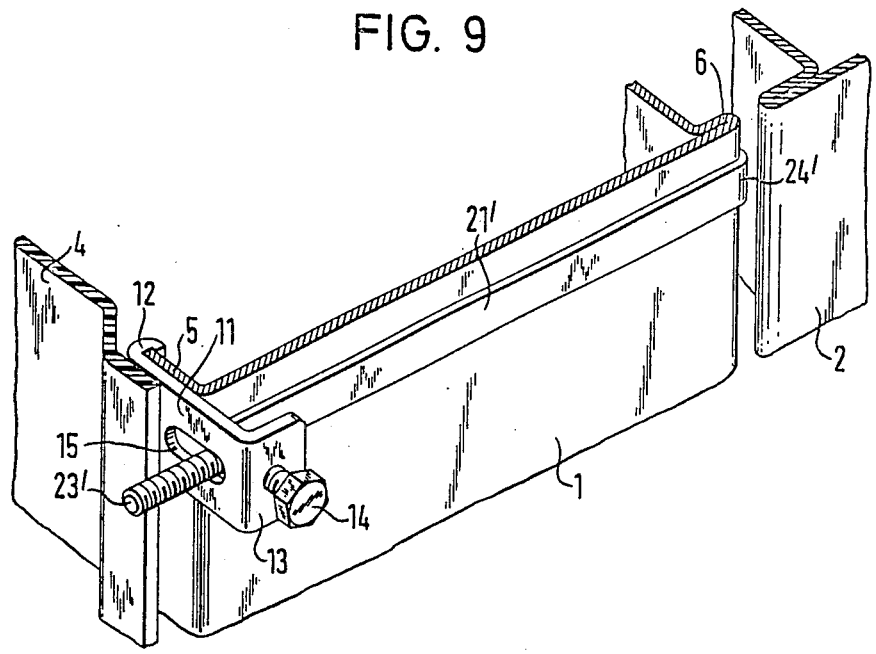
Figure 10:
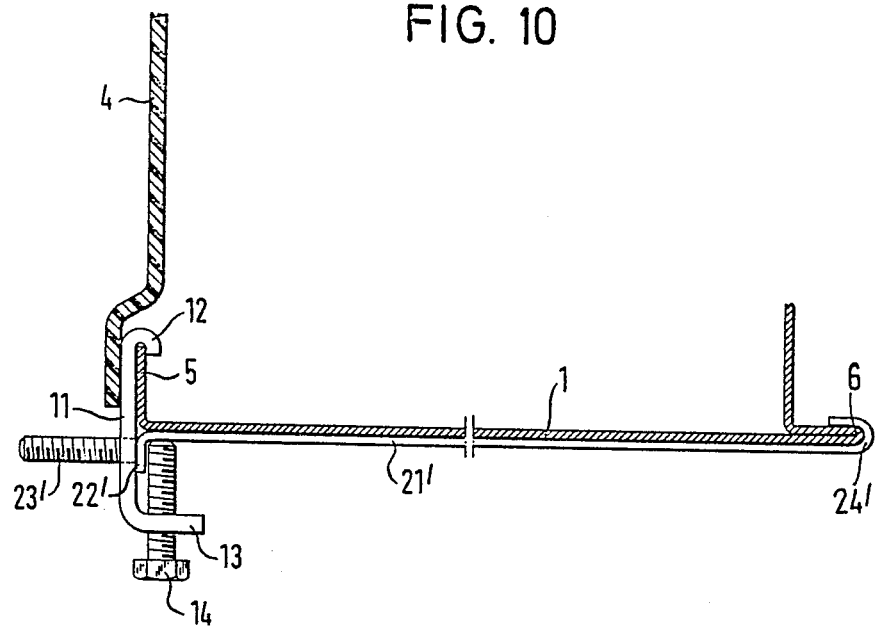
FIG. 10 shows another view of the device of FIG. 9.

In the embodiment according to FIG. 9 and 10, a bracket according to FIG. 2 is used, which cooperates with a pressure member having a clasping strip 21' with a clasping area 24' provided at one end, whilst a bent portion 22' is provided at the other end and carries on its outside a threaded bolt 23'. The clasping area embraces the edge 6 of vehicle body 1 formed by the door opening. The length of the clasping strip 21' is selected in such a way that the outer face of bent portion 22' is substantially aligned in this position with the outer face of fender fold 5 (FIG. 10).

Following the insertion of bracket 10 between inner fender 4 and fender fold 5 with the bracket section 12 engaging with the free edge of fender fold 5, screw 14 is tightened and engages behind the inner face of bent portion 22 and is in contact therewith. Thus, on tightening the screw in the aforementioned manner, the central part of bracket 10 is pressed against the outer face of bent portion 22'. As a result of the engagement of the free end of screw 14 and the upper face of the clasping strip 21', the bracket section 12 is drawn against the free edge of fender 5 and the reliable securing of bracket 10 is ensured. The mud flap can then be fitted in the manner described in conjunction with the embodiment according to FIGS. 2 to 4.

Figure 11:
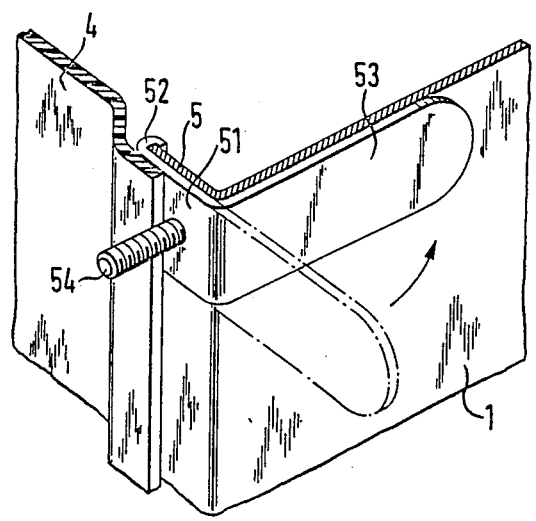
FIG. 11 shows an embodiment with a bracket to be fixed by bonding.

The device according to FIG. 11 essentially comprises a bracket with a central part 51, on one end of which is shaped a bracket section 52, which engages with the free edge of the fender fold 5, while a folding section 53 is provided on its other end. A threaded bolt 54 is fixed to central part 51.

For fitting purposes, central part 51 and bracket section 52 are inserted between the inner fender 4 and fender fold 5 in such a way that bracket section 52 engages with the free edge of fender fold 5. Following this positioning, the holding section is bent round and is engaged with the vehicle body 1, where it is secured by bonding. In this way, the bracket is reliably positioned and, as explained in connection with the previous embodiments, a mud flap can be fixed to screw bolt 54.

Obviously, in the case of this device, the dimensions of the central part and the position of threaded bolt 54 must be selected in such a way that fitting to the corresponding fender fold 5 is possible, i.e. in particular threaded bolt 54 must be positioned so that it is located outside the area covered by the inner fender 54.

Figure 12:
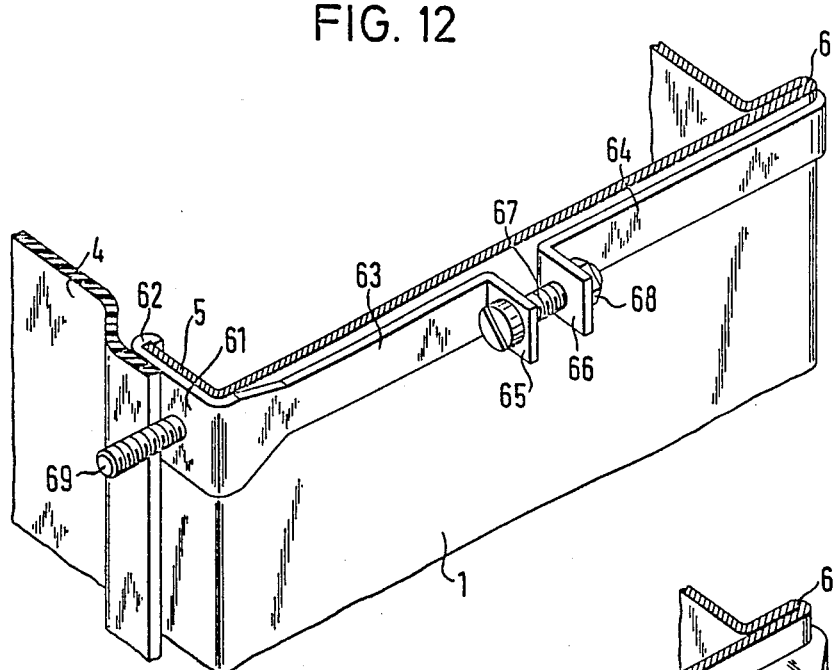

The operation of the device according to FIG. 12 corresponds to that of FIG. 11. A bracket section 62 shaped onto the central part 61 of a bracket engages with the free edge of fender fold 5, whilst a portion 63 of a holding section is shaped onto the other end of central part 61. A threaded bolt 69 is also fixed to central part 61. The free end of portion 63 of the holding section is bent to form a shoulder 65. A second portion 64 of the holding section has a bent shoulder 66 at its end adjacent to shoulder 65 whilst at the opposite end a bracket is provided, which engages with edge 6 of the door opening in vehicle body 1. Bores are provided in shoulders 65, 66 through which is introduced a screw 67, onto which is screwed a nut 68.

Following the insertion of central part 61 and bracket section 62 between inner fender 4 and fender fold 5 and the engagement of bracket section 62 with the free edge of fender fold 5 and following the mounting of the clasping or hooking area of portion 64 of the holding section on edge 6, screw 67 is inserted through the holes in shoulders 65 and 66 and nut 68 is screwed down, so that portions 63 and 64 of the holding section are secured and the bracket is held in position. A mud flap can be mounted on threaded bolt 69 in this position.

Figure 13:
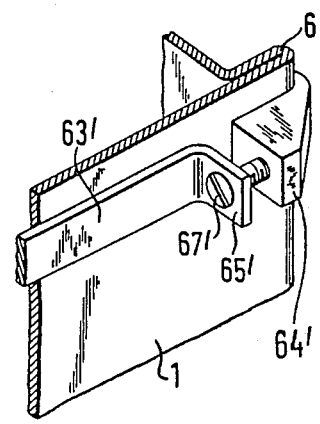
FIG. 13 shows a modification of the embodiment of FIG. 12.

FIG. 13 shows a device which is modified compared with that of FIG. 12, in that the portion 64' of the clasping strip having the clasping area merely comprises a solid member with a threaded bore. A screw 67' is placed through a bent shoulder 65' of portion 63' of the clasping strip and is screwed down for securing the bracket which is otherwise constructed in accordance with FIG. 12.

Vehicles also exist in which the inner fender does not rest on the outer face of the fender fold as shown in FIG. 1 but where instead the inner fender 4' (FIG. 14) is fixed to the inner face of fender fold 5 and extends away therefrom by means of a bend. The space formed between the imaginary extension of the fender fold and the main course of the inner fender 4' is then filled with sound-insulating material 7. Due to the fixing of inner fender 4' to the inner face of fender fold 5 fixing of a mud flap cannot be effected by an embracing action of the free edge of the fender fold or a larger area of the latter.

Figure 14:
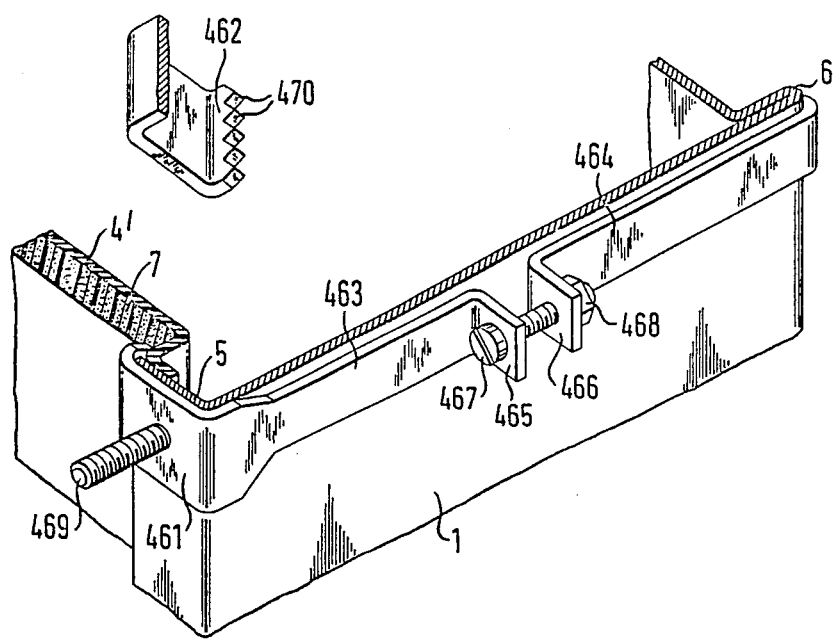
FIG. 14 shows a bracket which can be hung in for an arrangement with an inner fender.

The device according to FIG. 14 is essentially constructed in the same way as that according to FIG. 12, because it has a holding section comprising two portions 463, 464, whereof portion 463 emanates from a central part 461 of a bracket and carries a shoulder 465 at its other end. Portion 464 of the bracket section is also provided at one end with a shoulder 466 and at the other end with a clasping area for engagement with edge 6 of vehicle body 1. The two portions 463, 464 are drawn together in the manner described in connection with FIG. 12 by means of a screw 467 and a nut 468, in order to position the bracket.

Unlike in the case of the bracket according to FIG. 12, in this case it has on its central part 461 a bracket section 462 with teeth or claws 470 extending substantially parallel to the longitudinal extension of central part 461. The distance between the teeth or claws 470 and central part 461 is much larger than the material thickness of fender fold 5. In the case of the fitting of the bracket shown in FIG. 14, the teeth or claws 470 engage with the sound-insulating material 7 and are held in this position by means of the tension produced by screw 467 and nut 468. Thereby the bracket is reliably positioned and a mud flap can be mounted on its screw bolt 469.

Figure 15:
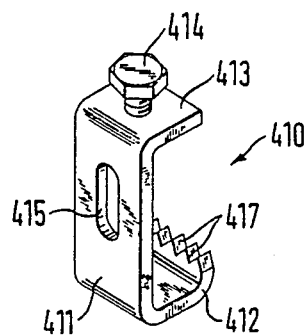
FIG. 15 shows a bracket similar to FIG. 2, which is suitable for fitting in the case of an inner fender arrangement according to FIG. 14.

In order to be able to use a device according to FIGS. 2 to 4 in connection with an inner fender arrangement as shown in FIG. 14, the bracket 10 according to FIG. 2 can be replaced by bracket 410 according to FIG. 15 which, with respect to its central part 411 and its support 413, including screw 414 and elongated slot 415, is constructed in the same way as bracket 10 of FIG. 2. However, the bracket section 412 has at its free end teeth or claws 417, which are essentially directed in the direction of support 415 and whose spacing from central part 411 is much larger than the spacing of the free end of bracket section 12 of bracket 10 from central part 11.

In the case of an inner fender arrangement according to FIG. 4, bracket 410 can be used in place of bracket 10 in the arrangements according to FIGS. 4, 9 and 10 and obviously it is possible to correspondingly modify the brackets according to FIGS. 5 and 6.

Figure 16:
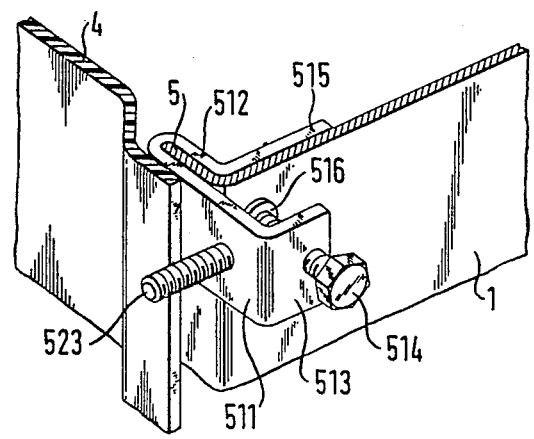
FIG. 16 shows a device with a single bracket.

The embodiment of FIG. 16 is used for fixing a mud flap to a vehicle, in which the fender fold 5 is covered on its outside, i.e. the face facing the wheel, by an inner fender 4.

The represented bracket has a central part 511, onto its inner end in the mounted state is shaped a bracket section 512, whose length corresponds to the width of fender fold 5, so that the supporting section 515 which extends away from the central part 511 and which is connected to the bracket section 512, engages in the fitted state with the inside of vehicle body 1, whilst the spacing between central part 511 and bracket section 512 only slightly exceeds the material thickness of fender fold 5. A bend 513 containing a taphole is provided on the other end of central part 511 and, in the fitted state, is spaced from the outside of vehicle body 1. A screw 514 is tapped into this taphole and is screwed down for fixing the bracket to body 1. A washer 516, e.g. made from plastic, can be located between body 1 and the free end of screw 514 to prevent damage to the paintwork.

A screw bolt 523 is fixed to central part 511 and is used for fixing a mud flap in the same way as described in connection with the embodiment of FIGS. 2 to 4.

In order to bring the bracket according to FIG. 16 in its represented position, generally the inner fender 4 is raised to such an extent from the fender fold 5, that the supporting section 515 and the bracket section 512 can be brought into the indicated position. However, in the case of certain vehicles it is also possible to mount the bracket in the represented manner on a not covered or easily accessible part of fender fold 5 and then to move the bracket into the desired position for fixing the mudflap.

What I claim is:

1. A device for fixing a mud flap to a motor vehicle body having a fender with a fender fold of predetermined width disposed substantially transversely to said fender, said fender fold having a free edge, said motor vehicle body having a body portion adjacent said fender fold, said device comprising:
    a bracket with
        a central part having a first end and a second end, said central part having a length from said first end to said second end at least substantially equal to said width of said fender fold,
        a bracket section, at said first end of said central part, said bracket section including a bent portion cooperating with said central part for engaging substantially only the free edge said fender fold,
        a holding section, at said second end of said central part, adapted to be bent into engagement with said body portion adjacent said fender fold and adhesive means for bonding said holding section to said body portion, said bracket section and said holding section, in use, cooperating to fix said bracket to said motor vehicle body with said central part disposed over said fender fold; and
    at least one fixing member which is supportingly engageable of a mud flap, said fixing member being fixable to said central part of said bracket.

2. The device according to claim 1, wherein said central part, said bracket section and said holding section are integrally formed with one another.

3. The device according to claim 1, wherein said bracket comprises a substantially planar member.

4. The device according to claim 3, wherein said holding section of said bracket may be bent out of plane relative to said central part of said bracket.

5. The device according to claim 1, wherein said fixing member comprises a threaded bolt.

* * * * *